(12) United States Patent
Shafee (10) Patent No.: US 9,918,592 B2
(45) Date of Patent: Mar. 20, 2018

(54) EXPANDABLE AND COLLAPSIBLE CONTAINER

(71) Applicant: Abdullah M. Shafee, Laguna Hills, CA (US)

(72) Inventor: Abdullah M. Shafee, Laguna Hills, CA (US)

( * ) Notice: Subject to any disclaimer, the term of this patent is extended or adjusted under 35 U.S.C. 154(b) by 132 days.

(21) Appl. No.: 14/673,431

(22) Filed: Mar. 30, 2015

(65) Prior Publication Data

US 2016/0288954 A1 Oct. 6, 2016

(51) Int. Cl.
*A45D 33/20* (2006.01)
*A47J 47/14* (2006.01)
*B65D 25/00* (2006.01)
*B65D 25/34* (2006.01)

(52) U.S. Cl.
CPC ............ *A47J 47/14* (2013.01); *B65D 25/005* (2013.01); *B65D 25/34* (2013.01)

(58) Field of Classification Search
CPC .... B65D 25/005; B65D 25/34; B65D 21/083; A47J 47/14
USPC ... 220/4.27, 23.83, 500, 507, 523, 524, 525, 220/666, 526; 132/294, 295; 294/161
See application file for complete search history.

(56) References Cited

U.S. PATENT DOCUMENTS

| 2,575,299 A * | 11/1951 | Scheel ............ A45C 11/20 126/261 |
| 3,188,157 A * | 6/1965 | Rand .............. A45D 33/00 220/23.8 |
| 4,662,537 A * | 5/1987 | Wolf .............. A61J 7/0481 206/539 |
| 5,118,034 A | 6/1992 | Tsao |
| 5,137,210 A | 8/1992 | Hibbs |
| 5,772,066 A * | 6/1998 | Reynolds ........... A45C 7/0063 220/23.83 |

(Continued)

FOREIGN PATENT DOCUMENTS

| GB | 2478562 A | 9/2011 |
| JP | 2014-9032 A | 1/2014 |

OTHER PUBLICATIONS

Redbook-Kidbook, "Think Outside the Lunch Box," Nov. 7, 2012, 2 Pages, http://kidskonserve.com/pdfs/2013-01-redbook-kidbook.pdf.

(Continued)

*Primary Examiner* — J. Gregory Pickett
*Assistant Examiner* — Elizabeth Volz
(74) *Attorney, Agent, or Firm* — Oblon, McClelland, Maier & Neustadt, L.L.P.

(57) ABSTRACT

An expandable and collapsible container includes a lower fixed chamber, a movable chamber configured to rotate outward from a central body of the container in an expansible position and to rotate inward in a collapsible position, and an upper fixed chamber. The container also includes a first lid configured to cover the lower fixed chamber and rotate outward from the central body of the container, a second lid configured to cover the movable chamber and to rotate outward from the central body of the container, and a third lid configured to cover the upper fixed chamber and to rotate outward from the central body of the container. The container also includes a covering on an outer surface of one or more of the lower fixed chamber, the movable chamber, and the upper fixed chamber, wherein the covering is configured to receive and hold one or more articles.

15 Claims, 7 Drawing Sheets

(56) References Cited

U.S. PATENT DOCUMENTS 5,799,787 A * 9/1998 Talbot .................. B25H 3/025
206/315.11

OTHER PUBLICATIONS

Bestop Industry Co., Ltd, "Snackeez 2-in-1 Drink and Snack Cup," 2 Pages, http://www.bestop-tvitem.com/showpro.asp?ArticleID=8383.

* cited by examiner

EXPANDABLE AND COLLAPSIBLE CONTAINER

BACKGROUND

Grant of Non-Exclusive Right

This application was prepared with financial support from the Saudi Arabian Cultural Mission, and in consideration therefore the present inventor(s) has granted The Kingdom of Saudi Arabia a non-exclusive right to practice the present invention.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Containers of many different types, shapes, and sizes exist for a myriad of purposes for both food and non-food items. Containers are used for service, display, storage, and shipping of various items. Unfortunately, a single purpose or end use may require multiple containers. For example, a transported meal may entail several containers of different food dishes, sauces, condiments, and utensils. In addition, some items are liquid while other items are solid. Also, some items should be kept warm while other items should be kept cold. As a result, a single transported meal may require several containers.

Several other food-related and nonfood-related tasks frequently require multiple containers to meet a single objective. As a result, some containers may become lost, other containers may lose an associated cover, and a time-consuming task of cleaning all of the containers is required.

SUMMARY

In one embodiment, a portable expandable and collapsible container includes a lower fixed chamber, a movable chamber configured to rotate outward away from a central body of the container in an expansible position and to rotate inward in a collapsible position, and an upper fixed chamber. The container also includes a first lid configured to cover the lower fixed chamber and rotate outward away from the central body of the container in an expansible position and to rotate inward in a collapsible position, a second lid configured to cover the movable chamber and to rotate outward away from the central body of the container in an expansible position and to rotate inward in a collapsible position, and a third lid configured to cover the upper fixed chamber and to rotate outward away from the central body of the container in an expansible position and to rotate inward in a collapsible position. The container also includes a covering on an outer surface of one or more of the lower fixed chamber, the movable chamber, and the upper fixed chamber, wherein the covering is configured to receive and hold one or more articles.

In another embodiment, a portable expandable and collapsible container includes a lower fixed chamber, a movable chamber configured to rotate outward away from a central body of the container in an expansible position and to rotate inward in a collapsible position, and an upper fixed chamber. The container also includes a first lid configured to cover the lower fixed chamber and rotate outward away from the central body of the container in an expansible position and to rotate inward in a collapsible position, a second lid configured to cover the movable chamber and to rotate outward away from the central body of the container in an expansible position and to rotate inward in a collapsible position, and a third lid configured to cover the upper fixed chamber and to rotate outward away from the central body of the container in an expansible position and to rotate inward in a collapsible position. The container also includes one or more stability structures on a lower portion of the portable expandable and collapsible container.

In another embodiment, a portable expandable and collapsible container includes a lower fixed chamber configured with a meshed wall and a meshed floor. The container also includes a movable chamber configured to rotate outward away from a central body of the container in an expansible position and to rotate inward between the lower fixed chamber and an upper fixed surface of the container in a collapsible position. The container also includes an upper movable chamber secured to the upper fixed surface of the container via one or more fastening fixtures. The upper movable chamber is tethered to the container via an extensible tethering line.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1AA illustrates a structural frame of a portable expandable and collapsible container according to an embodiment;

DETAILED DESCRIPTION OF THE EMBODIMENTS

Embodiments herein describe an expandable and collapsible container with multiple chambers. A multi-purpose expandable cup includes three or more different sections. Two of the sections are inside the cup and one is to the outside of the cup, such as an extension to the side of the cup. Two internal sections are configured to carry certain foods, such as dipping sauce and some solid food. The expandable cup can have a transparent external coating that is configured to hold paper items or it can be used for marketing or to hold a personal picture. The expandable cup can include a built-in expandable straw. The expandable cup can also include an attached lid containing a detachable utensil, such as a spork. A mesh pocket can be included to the side of the expandable cup, which can be configured for storage of different food and food-related items. Two handles to each side of the expandable cup can be included with an attached lanyard for carrying the multi-purpose expandable cup around a user's neck or shoulder, or it can be carried as a backpack.

Figure 1:
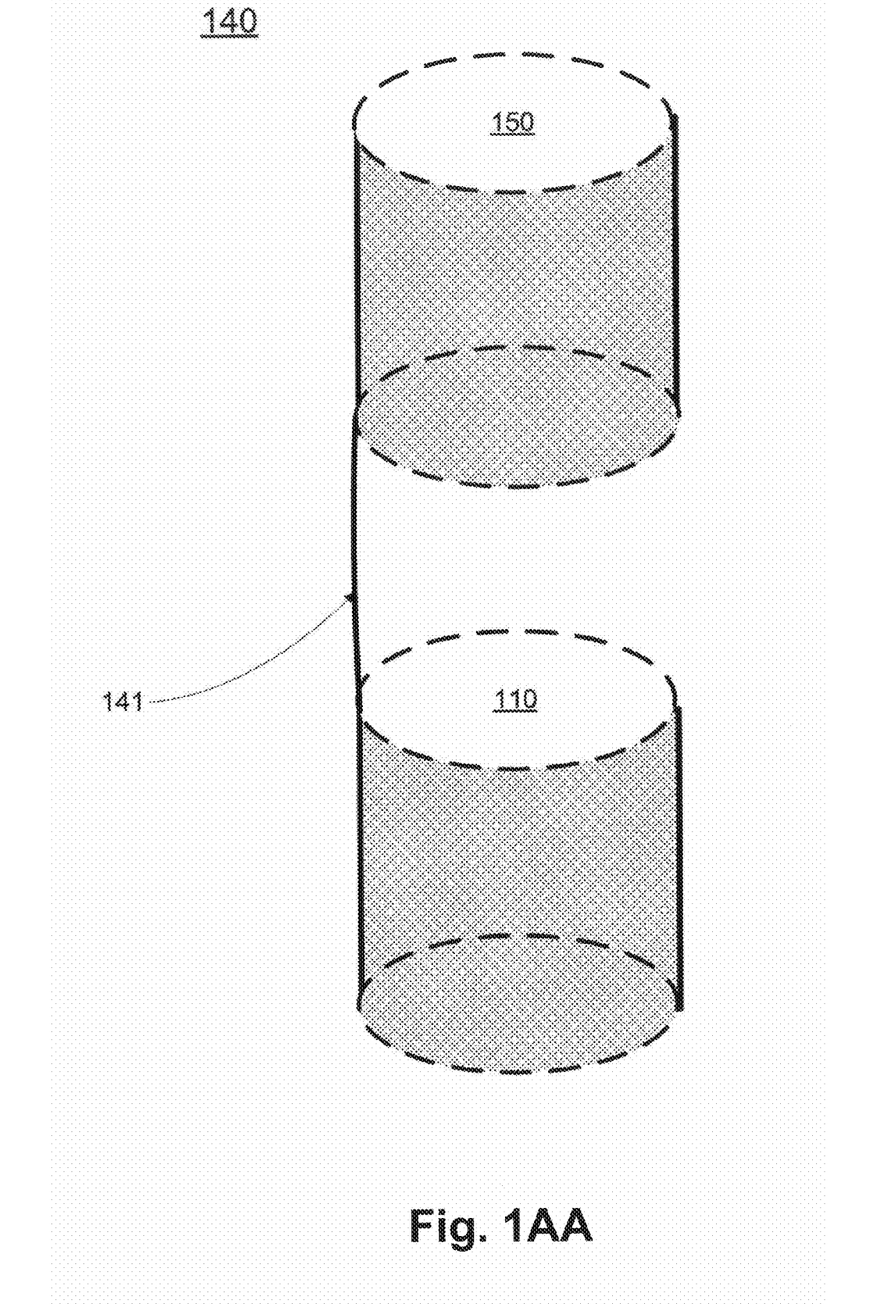
Figure 1A:
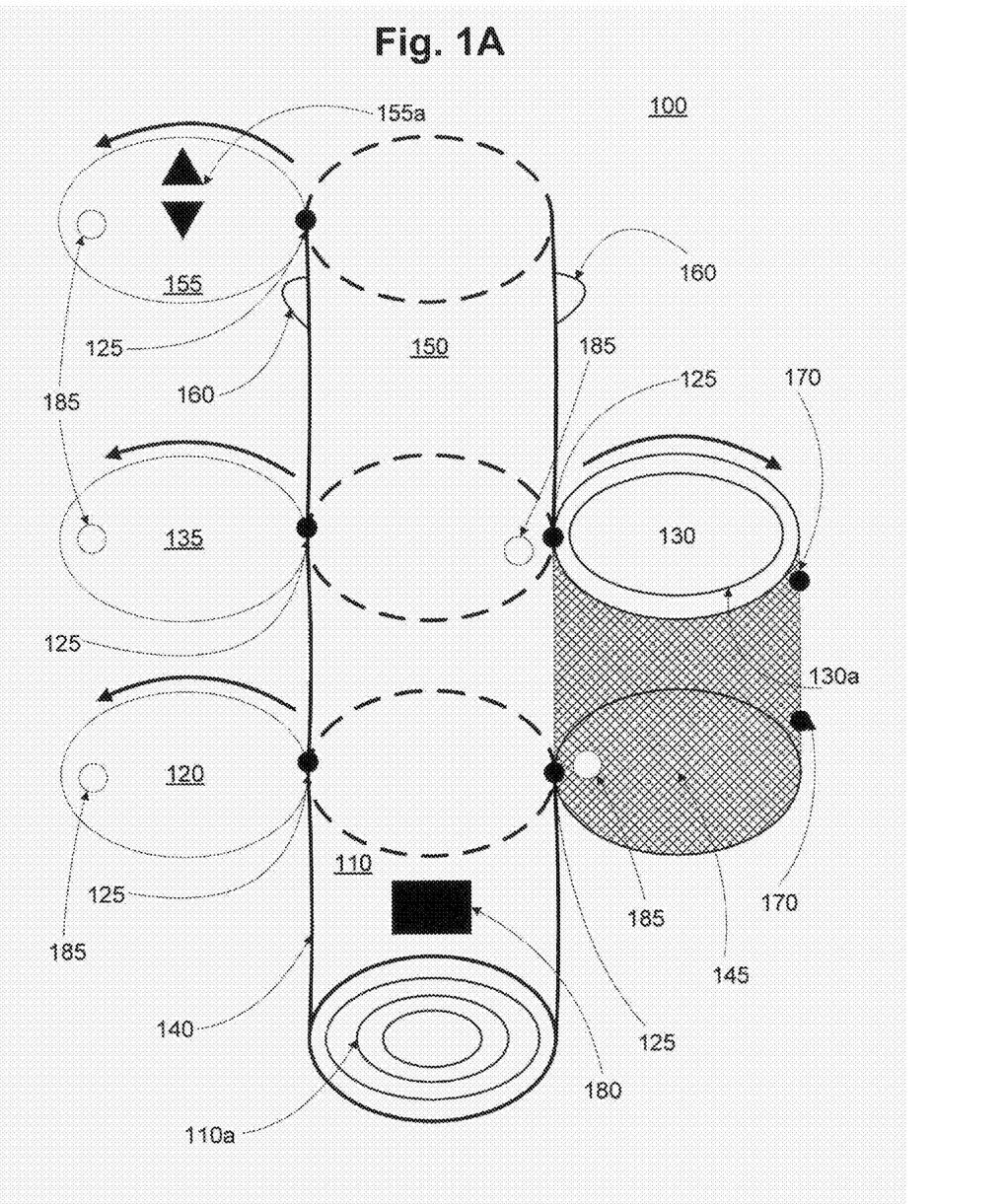
FIG. 1A illustrates a portable expandable and collapsible container according to an embodiment.

FIG. 1A illustrates a portable expandable and collapsible container 100. In one embodiment, the container 100 can be used as a portable carrier for food and food-related items. Container 100 includes a lower fixed chamber 110 configured to hold a liquid, such as a drink, or other low viscosity food item, such as soup. A removable lid 120 is configured to cover the lower fixed chamber 110 and is also configured to rotate outward away from the body of the container 100 via a rivet 125 or other similar fixture. Rotating the removable lid 120 outward in an expandable position allows the lower fixed chamber 110 to be filled and to be cleaned. Rotating the removable lid 120 inward in a collapsible position over the lower fixed chamber 110 provides a cover for the contents of the lower fixed chamber 110. Lower fixed chamber 110 can also include a heating element 110*a*, for example a heating coil, to help keep hot food, such as soup, from cooling off.

Container 100 also includes a movable middle chamber 130 that is configured to rotate outward away from the central body of the container 100 in an expandable position via upper and lower rivets 125 or other similar fixtures. The expanded middle chamber 130 provides direct access to the contents within the movable middle chamber 130. The movable middle chamber 130 can also include an upper and a lower protrusion 170 that are configured to mate with associated recessions within a structural frame 140 of the container 100 at an opposite side when the movable middle chamber 130 is completely collapsed, i.e. at the left side of the structural frame 140 in FIG. 1A. The movable middle chamber 130 allows the contents therein to be used or consumed in an open expandable position. The open expandable position also allows the movable middle chamber 130 to be filled and cleaned. A lid 135 is configured to be rotated outward away from the body of the container 100 in an expandable position via rivet 125 or other similar fixture, and is also configured to rotate inward in a collapsible position to cover the contents of the movable middle chamber 130. Movable middle chamber 130 can also include an insulated layer 130*a* to help keep contents at their original temperature.

In an embodiment, the structural frame 140 includes fixed chambers 110 and 150, as well as a structural spine along the left side of container 100. The structural spine provides support for the outwardly rotating chamber 130 of the single homogenous container 100. FIG. 1AA illustrates the structural frame 140, which includes the structural immovable features of single homogenous container 100. The structural immovable features include fixed chambers 110 and 150, and a structural spine 141 connecting the fixed chambers 110 and 150.

The movable middle chamber 130 also includes a covering 145 surrounding at least a portion of the outside surface of the movable middle chamber 130. The covering 145 can include a clear plastic covering with an open end for inserting various items, such as photographs, notes, instructions, a daily schedule, reading material, or other various items. The covering 145 can also be used as a marketing or advertising feature. The covering 145 can also include a mesh see-through material with an elastic material surrounding the open side for inserting various items, as described above. Other materials and combinations of materials for covering 145 which provide a pocketed area for inserting various items and which can be viewed from an exterior view of the container 100 are contemplated by embodiments described herein.

Container 100 also includes an upper fixed chamber 150 configured to hold other solid or semi-solid food items, packaged food items such as sauce or dipping packets, condiments, or other food-related items such as a napkin, straw, disposable utensils, or a disposable hand wipe. A lid 155 is configured to cover the upper fixed chamber 150 and any contents therein. Rotating the lid 155 outward away from the body of the container 100 in an expandable position via rivet 125 or other similar fixture allows direct access to the contents and cleaning of the upper fixed chamber 150. Rotating the lid 155 inward in a collapsible position provides a cover for the contents of the upper fixed chamber 150. Lid 155 can also be configured with depressions or receptacles 155*a* for receiving and holding items, such as a spork or other disposable utensil. Loops 160 on either side of the container 100 allow a lanyard to be secured to the container 100 so it can be carried by the hand or shoulder of a user, or it can be mounted and carried on a user's back.

Container 100 is illustrated with a covering 145 only on the movable middle chamber 130. However, a covering can be included on the lower fixed chamber 110 and/or the upper fixed chamber 150 in addition to or in lieu of the movable middle chamber 130. Embodiments also include one or more expandable exterior pockets on the container 100 for holding additional items, such as cups, bowls, or plates. An embodiment of an expandable exterior pocket includes a mesh material with an elasticized upper open edge.

Container 100 can also include an electronic recording medium 180 attached to or integrated with any one of the lower fixed chamber 110, the movable middle chamber 130, or the upper fixed chamber 150. The recording medium 180 can be programmed and configured with circuitry to record a message to the user of the container 100, such as a message from a spouse or a parent containing instructions or a personal message. The recording medium 180 can also be programmed and configured with circuitry to record instructions for a custodian of the container 100, such as a care giver.

Container 100 can also include small openings 185 in each of the lids 120, 135, and 155, as well as the lower surfaces of the upper fixed chamber 150 and the movable middle chamber 130 to allow a straw to be inserted there through and reach a liquid contained in the lower fixed chamber 110. This would allow a user to drink directly from the lower fixed chamber 110 while the container 100 is completely collapsed. Each of the straw openings 185 can be configured with a spring-loaded cover to keep the straw openings 185 closed when not in use. In addition, one or more of the straw openings 185 could alternatively be used as a flag or pendant insertion point for displaying a flag of interest or an advertising banner.

Container 100 has been described as a food container, such as a portable meal container or a picnic container. The three chambers provide a top fixed chamber 150 configured to contain dry or packaged food items and/or food-related items, a movable middle chamber 130 configured to contain various higher viscosity foods, and a lower fixed chamber 110 configured to contain lower viscosity foods. In container 100, one or more of the chambers can be insulated from environmental temperatures and be insulated from adjacent chambers. This is an advantage when both hot food items and cold food items are contained within the container 100. One example is a hot soup contained within the lower fixed chamber 110 and a cold salad contained within the movable middle chamber 130. In addition, one or more chambers can be configured with a heating element, similar to heating element 110a, to keep hot foods hot for a longer period of time. The heating element(s) can be located within the walls of the chamber(s). A battery charging feature could also be included with the container 100 for powering the heating element(s), including heating element 110a, wirelessly, or a power cord could be included to power the heating element(s) via an electrical outlet. Also, one or more chambers can be configured with a cooling feature, such as a freezable dry ice element. The freezable element can be located within the walls of the chamber(s), which freezes when subjected to a freezing temperature. A contained freezable element can also be configured to detach from the chamber for direct freezing, then re-attached to the chamber when ready for use.

Container 100 can be used to directly contain loose food products within one or more chambers. In addition, one or more chambers can be configured to hold food containers, such as a canned food or drink product, which can subsequently be emptied into a chamber for consumption.

An additional embodiment includes using container 100 as a baby food container. One chamber can be configured to hold a bottle of water, milk, or formula, while another chamber can be configured to hold a container of baby food. In addition, one or more of the chambers can heat the drink or food via one or more heating elements contained within the walls of the chamber(s). Another chamber can be configured to contain food-related items, such as a bib, bottle nipple, wet cloth, and/or dry cloth.

The recording medium 180 can also be programmed and configured with circuitry to record a schedule for the user. For example, instructions can be recorded for eating a particular food item before or after a class or other activity. In addition, instructions can be recorded for taking a medication with or without eating a particular food item from the container 100. Container 100 is illustrated in FIG. 1A as a single homogenous structure via structural frame 140, wherein one or more chambers are connected to the structural frame 140 by rivets 125 or other similar fixtures. However, container 100 can be configured to disassemble into separate chambers. The chambers can be re-assembled via one or more notched grooves and mating protrusions on the joining circumferential edges of the chambers, or the chambers can include mating threads on the circumferential edges, which are screwed together. Corresponding lids 120 and 135 can be recessed within the protrusion and circumferential edges in lieu of outwardly rotating lids. The recessed lids could include a small central protrusion or ring for grasping during use. In another embodiment, the movable middle chamber 130 can include an upper peg and a lower peg that mate with a receptacle on the lower edge of the upper fixed chamber 150 and on the upper edge of the lower fixed chamber 110, respectively.

Figure 1B:
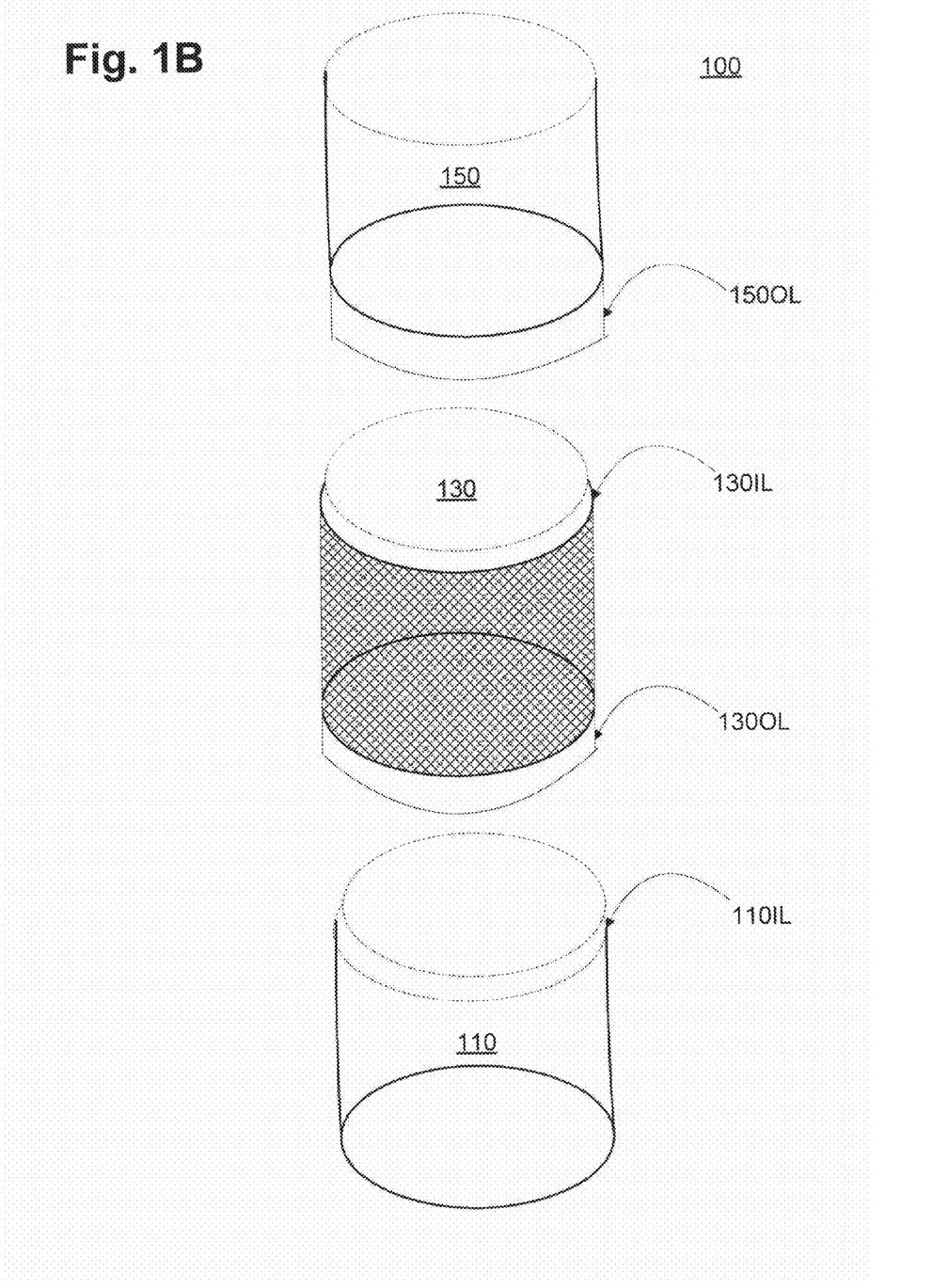
FIG. 1B illustrates a container with separately adjoining chambers container according to an embodiment.

FIG. 1B illustrates container 100 as three separately adjoining chambers. The lower edge of upper fixed chamber 150 includes an outer lip 150OL that is configured to slide over an inner lip 130IL of the upper edge of middle chamber 130. The lower edge of middle chamber 130 includes an outer lip 130OL that is configured to slide over an inner lip 110IL of lower fixed chamber 110.

Figure 1C:
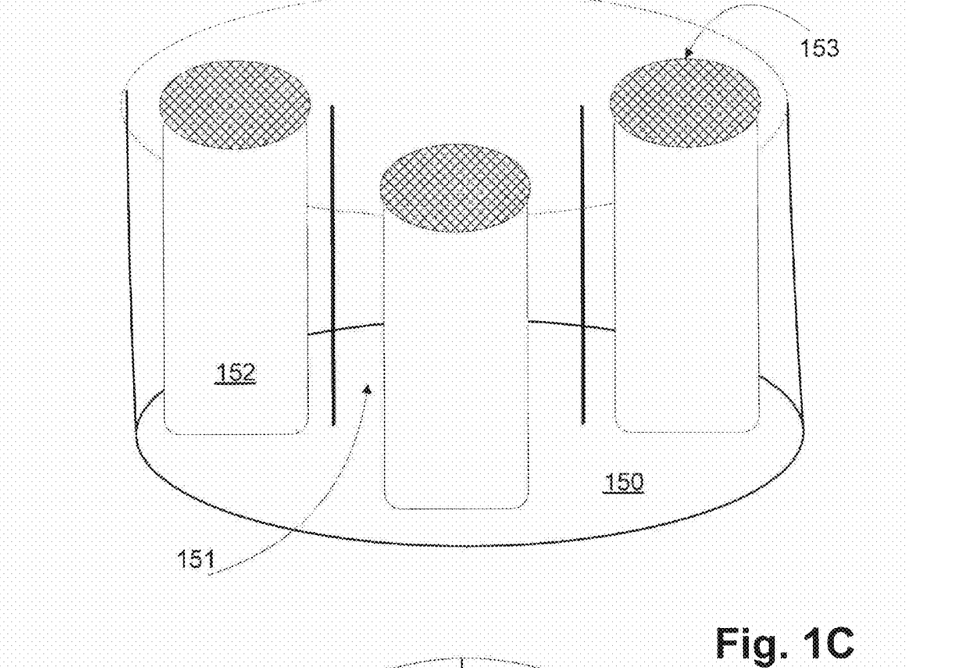
FIG. 1C illustrates an upper fixed chamber of a container divided into multiple slots according to an embodiment.

Upper fixed chamber 150 can also be configured with multiple interior chambers for placing timed medications for the user of the container 100. This can be used in conjunction with the recorded instructions from the recording medium 180. An indicator, such as a light indicator and/or an audible signal indicator can be used in conjunction with the recorded scheduled instructions. FIG. 1C illustrates a side view and a top view of an embodiment of upper fixed chamber 150 divided into multiple slots 151. Each slot 151 contains a removable container 152 that is configured to fit within its associated slot 151. One or more of the removable containers 152 can hold medications for use by the user of container 100. In a further embodiment, caps 153 of the removable containers 152 can be labeled with the days of the week to aid the user in taking medications on time.

Container 100 is illustrated in FIGS. 1A and 1B as having three chambers. However, fewer than three or more than three chambers are contemplated by embodiments described herein. In addition, container 100 can include more than one expandable chamber.

Figure 2:
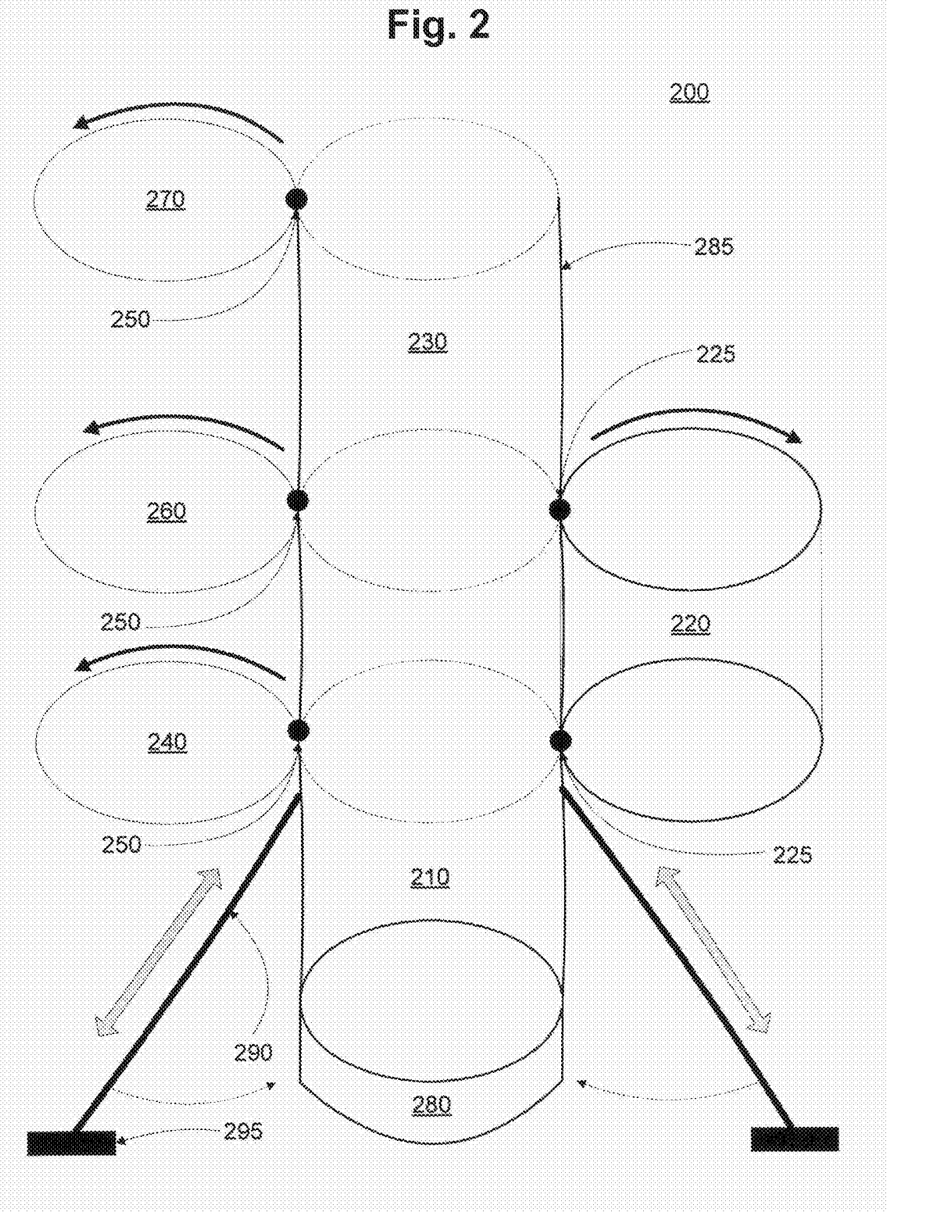
FIG. 2 illustrates a portable expandable and collapsible container with stability structures according to an embodiment.

FIG. 2 illustrates another embodiment of a portable expandable and collapsible container 200. Container 200 includes a lower fixed chamber 210, a movable middle chamber 220, and an upper fixed chamber 230. A lower lid 240 is configured to rotate outward away from the body of the container 200 in an expandable position via a rivet 250 or other similar fixture. This allows lower fixed chamber 210 to be filled and cleaned. The lower lid 240 is subsequently rotated inward in a collapsible position to cover the contents of the lower fixed chamber 210.

The movable middle chamber 220 can be rotated outward away from the body of container 200 in an expandable position via an upper and a lower rivet 225 or other similar fixture to provide direct access to the contents within the movable middle chamber 220. The expansion of movable middle chamber 220 also provides access to lower fixed chamber 210 when the lower lid 240 is expanded outwardly. A middle lid 260 is configured to rotate outward away from the body of the container 200 in an expandable position via a rivet 250 or other similar fixture. The middle lid 260 can be rotated inward in a collapsible position to cover the contents of the collapsed movable middle chamber 220.

An upper lid 270 is configured to rotate outward away from the body of the container 200 in an expandable position via a rivet 250 or other similar fixture. This allows upper fixed chamber 230 to be filled and cleaned. The upper lid 270 can be rotated inward in a collapsible position to cover the contents of the upper fixed chamber 230.

Container 200 also contains a lower stability chamber 280 configured to contain a weighted material. This allows the center of gravity of container 200 to be lowered, which assists in keeping container 200 upright. The weighted material could include, but is not limited to, water or other stable liquid, sand, rock salt, metal pellets, or gravel. An alternative embodiment includes a solid plate in lieu of the lower stability chamber 280. The solid plate can be permanently affixed to container 200 or it can be attached and detached to and from container 200.

Container 200 also contains two or more retractable stability arms 290. This provides additional stability to container 200 during use and/or when positioned on an uneven surface. The stability arms 290 can be extended for use and retracted when not in use. The stability arms 290 are also configured to rotate inward towards the body of the container 200 when not in use. A latch can also be included to hold each stability arm 290 against the body of the container 200 when not in use. A foot 295 is attached to the loose end of each stability arm 290 to provide a stable footing for the stability arms 290. The feet 295 can be configured to freely rotate, so as to adjust to any uneven surface and to lie flat against the body of the container 200 when the stability arms 290 are retracted and latched against the container 200 when not in use.

Container 200 can also include one or more anchor posts that are affixed to a lower edge of the container 200. The anchor posts can be used when the container is positioned on an open earth area, wherein the anchor posts are pushed or driven into the earth to secure the container 200.

Container 200 is illustrated in FIG. 2 as a single homogenous structure, wherein the chambers are connected to a structural frame 285 by rivets 250 or other similar fixtures. However, container 200 can be configured to disassemble into separate chambers. The chambers can be re-assembled via one or more notched grooves and mating protrusions on the joining circumferential edges of the chambers, or the chambers can include mating threads on the circumferential edges, which are screwed together. In another embodiment, the movable middle chamber 220 can include an upper peg and a lower peg that mate with a receptacle on the lower edge of the upper fixed chamber 230 and on the upper edge of the lower fixed chamber 210, respectively.

In one embodiment, container 200 is configured to be used as a food dispenser for one or more users. For example, it can be used to dispense appetizer foods to a group of users while positioned on a tabletop. As a further example, chips could be located in the upper fixed chamber 230, raw vegetables could be located in the movable middle chamber 220, and a dip could be located in the lower fixed chamber 210. The lower stability chamber 280 assists in keeping the container 200 upright and in a stationary position. The stability arms 290 also assist in keeping the container 200 upright when the container 200 is pushed or bumped by one or more users. However, container 200 is configured for a variety of food-related and nonfood-related embodiments.

In one embodiment, container 200 is configured to be used as a toolbox, craft box, or sewing box, as well as several other purposes in which multiple pieces, tools, or materials are compartmentalized for future use. In another embodiment, container 200 is configured as a display container in which multiple types of items can be viewed and examined by potential buyers. Container 200 could also contain several chambers, including multiple movable chambers, which can be configured to expand in both directions away from the body of the container 200 to aid in stability.

In one embodiment, container 200 is configured to be used as a pet feeder. For example, the lower fixed chamber 210 could contain water or other liquid drink for the pet(s), and the movable middle chamber 220 could contain canned or dry pet food. Expanding the middle chamber 220 allows the pet access to both the food and drink chambers. The upper fixed chamber 230 could be used for storage of a leash, pet toys, or additional food, for example. The lower stability chamber 280 and/or the stability arms 290 assist in keeping the container stationary and in an upright position while the pet is feeding from the container 200.

Figure 3:
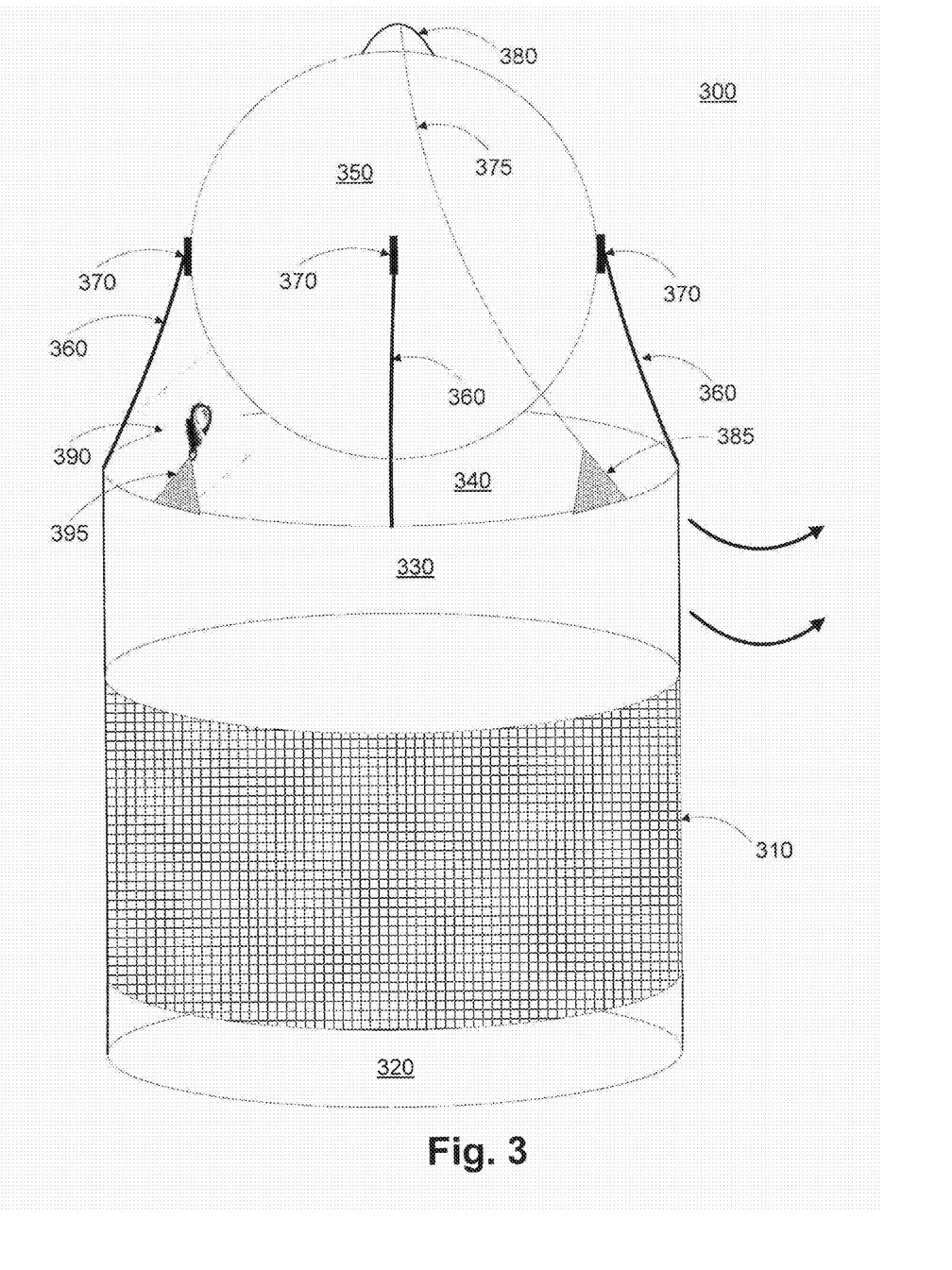
FIG. 3 illustrates a portable expandable and collapsible container with a spherical tethered chamber according to an embodiment.

FIG. 3 illustrates another embodiment of a portable expandable and collapsible container 300. A lower fixed chamber 310 is configured with one or more wire-meshed walls. This provides a maximum amount of air flow to the lower fixed chamber 310, while still keeping the contents contained therein. However, other meshed materials can be used that are consistent and safe with the intended use. In an embodiment, the lower fixed chamber 310 is configured to hold and transport a pet. The wire-meshed walls provide adequate air for the pet and also provide viewing to the inside by the pet caretaker and viewing to the outside by the pet. The floor of the lower fixed chamber 310 is also wire-meshed, such that pet droppings can fall through to a lower holding chamber 320 configured to contain droppings from the pet. The lower holding chamber 320 is configured to be removed for emptying and cleaning purposes. The lower holding chamber 320 can be attached to the lower surface of the lower fixed chamber 310 by mating threads of the two chambers, or by notched grooves of one chamber for receiving mated protrusions of the other chamber. The lower holding chamber 320 can also be configured to slip over a rim of the bottom surface of the lower fixed chamber 310.

FIG. 3 also illustrates a movable middle chamber 330, which is configured to rotate outward away from the body of container 300 in an expandable position via upper and lower rivets or other similar fixtures. This allows the movable middle chamber 330 to be filled with items, such as pet food and water containers or pet toys, for example. Expansion of the movable middle chamber 330 also provides access to the lower fixed chamber 310 for insertion and removal of the pet(s).

Container 300 also illustrates a fixed upper cover 340, which is configured to cover any contents of the collapsed movable middle chamber 330 and to provide a permanent upper surface of the container 300. In an embodiment, cover 340 is concave in shape.

A spherical chamber 350 is configured to be contained within the concave surface of the fixed upper cover 340. However, other volumetric geometries are contemplated for chamber 350. The spherical chamber 350 is held in place by multiple locking straps 360 and associated clamps 370 or other similar fixture at the free ends of the locking straps 360. Each clamp 370 is mated to a protrusion on the spherical chamber 350. In FIG. 3, four combined locking straps 360 and associated clamps 370 hold the spherical chamber 350 securely to the fixed upper cover 340, wherein three pairs of straps 360 and associated clamps 370 are showing, with a fourth pair out of view.

The spherical chamber 350 is also configured with an extensible leash 375 or other similar structure, such as a rope, cable, wire, or chain. The extensible leash 375 is tethered at one end to a loop 380, positioned at an upper surface of the secured spherical chamber 350. The other end of the extensible leash 375 is housed in a spring-loaded reel 385, which is affixed to the upper edge of the container 300. The spring-loaded reel 385 is configured to release the extensible leash 375 when a threshold tension is applied, and to recoil the extensible leash 375 within the housing when the threshold tension is no longer applied. The length of the extensible leash 375 and the threshold tension can be established or programmed according to a user's settings.

The spherical chamber 350 as described above provides a mechanism for a small pet to move about in a secure environment. The spherical chamber 350 is configured with a secured opening, in which a pet can be taken into and out of the spherical chamber 350. The spherical chamber 350 can be made of a transparent and non-breakable material in which the pet would be able to view its environment from inside. The straps 360 and associated clamps 370 can be released to provide movement of the spherical chamber 350, such that the spherical chamber 350 with a pet inside can roam about its surroundings at ground level, while still being secured to the container 300 by the tethered extensible leash 375.

Container 300 is also configured with a clasp 390 attached to an extensible cable or wire. The clasp 390 can be extended and retracted via a spring-loaded reel 395 affixed to an upper edge of the container 300. The clasp 390 and attached cable can be extended and wrapped around a permanent structure, such as a table leg or chair leg, a bicycle rack, a street sign, or a utility pole, for example, to secure the container 300 while the pet is moving about in the spherical chamber 350. The expandable and collapsible container 300 provides a comprehensive environment in which to transport and care for a pet.

Embodiments herein describe portable expandable and collapsible containers, which can be configured as a food dispensary, a storage or display container for non-food items, and as a pet feeder and pet transporter. The portable expandable and collapsible containers described herein are versatile, compact, and convenient. Other configurations of portable expandable and collapsible containers can be evident by the embodiments described herein. The portable expandable and collapsible containers can be configured in a wide range of sizes to meet the intended purpose. In addition, the portable expandable and collapsible containers can be configured with a varied number of movable chambers and a varied number of total chambers to meet the intended purpose.

Figure 4:
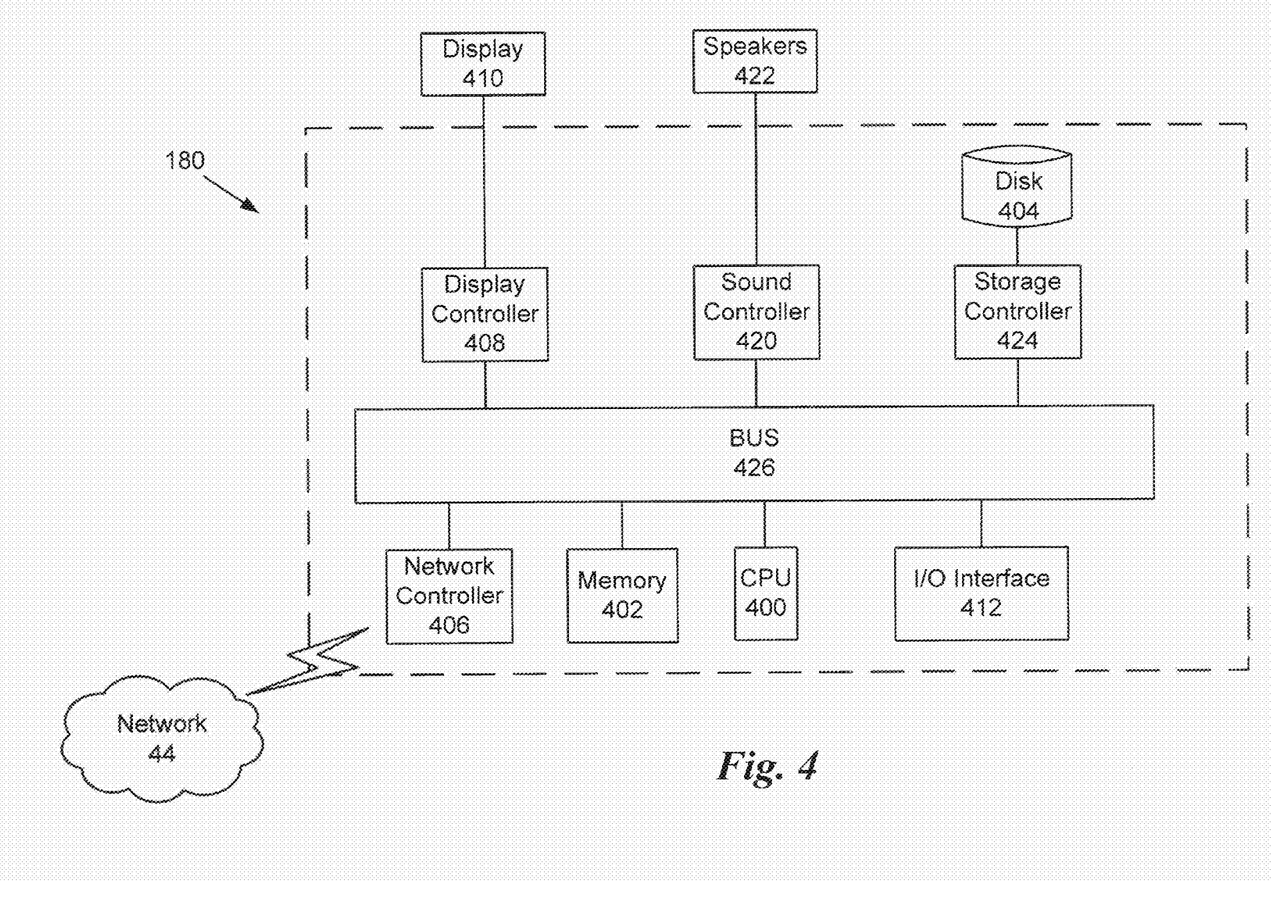
FIG. 4 illustrates a hardware layout of a computing system according to an embodiment.

A hardware description is given with reference to FIG. 4 for the recording device 180 used in conjunction with associated circuitry for embodiments described herein. Other devices and associated circuitry can be used in addition to and in conjunction with recording device 180, In FIG. 4, recording device 180 includes a CPU 400 which performs the processes described above. The process data and instructions may be stored in memory 402. These processes and instructions may also be stored on a storage medium disk 404 such as a hard disc drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which recording device 180 communicates, such as a computer.

Further, the claimed embodiments may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

Recording device 180 also includes a network controller 406, such as an Intel Ethernet PRO network interface card from Intel Corporation of America, for interfacing with network 44. As can be appreciated, the network 44 can be a public network, such as the Internet, or a private network such as an LAN or WAN network, or any combination thereof and can also include PSTN or ISDN sub-networks.

The network 44 can also be wired, such as an Ethernet network, or can be wireless such as a cellular network including EDGE, 3G and 4G wireless cellular systems. The wireless network can also be WiFi, Bluetooth, or any other wireless form of communication that is known.

Recording device 180 further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 can connect to a variety of peripherals via wired connections or wirelessly.

A sound controller 420 is also provided in recording device 180, such as Sound Blaster X-Fi Titanium from Creative, to interface with speakers/microphone 422 thereby providing sounds and/or music. The general purpose storage controller 424 connects the storage medium disk 404 with communication bus 426, which may be an ISA, EISA, VESA, PCI, or similar, for interconnecting all of the components of recording device 180. A description of the general features and functionality of the display controller 408, storage controller 424, network controller 406, sound controller 420, and general purpose I/O interface 412 is omitted herein for brevity as these features are known.

The recording devices used with embodiments described herein may not include all features described in FIG. 4. In addition, other features used with embodiments described herein may not be described with reference to FIG. 4. Embodiments described herein can be used in conjunction with other systems, devices, and structures.

The foregoing discussion discloses and describes merely exemplary embodiments of portable expandable and collapsible containers. As will be understood by those skilled in the art, the portable expandable and collapsible containers may be embodied in other specific forms without departing from the spirit or essential characteristics thereof. Accordingly, the disclosure herein is intended to be illustrative, but not limiting of the scope of the embodiments, as well as the claims. The disclosure, including any readily discernible variants of the teachings herein, define in part, the scope of the foregoing claim terminology such that no inventive subject matter is dedicated to the public.

The invention claimed is:

1. A portable expandable and collapsible container, comprising:
   a lower fixed chamber;
   a movable chamber configured to rotate outward away from a central body of the container in an expansible position and to rotate inward in a collapsible position;
   an upper fixed chamber;
   a first lid configured to cover the lower fixed chamber and rotate outward away from the central body of the container in an expansible position and to rotate inward in a collapsible position;
   a second lid configured to cover the movable chamber and to rotate outward away from the central body of the container in an expansible position and to rotate inward in a collapsible position;
   a third lid configured to cover the upper fixed chamber and to rotate outward away from the central body of the container in an expansible position and to rotate inward in a collapsible position;
   a covering on an outer surface of one or more of the lower fixed chamber, the movable chamber, and the upper fixed chamber, the covering configured to receive and hold one or more articles; and openings within the first lid, the second lid, the third lid, and the movable chamber, the openings configured to receive a straw for drinking liquid contents from the lower fixed chamber.

2. The portable expandable and collapsible container of claim 1, further comprising:
one or more receptacles within the third lid configured to hold one or more utensils.

3. The portable expandable and collapsible container of claim 2, wherein the covering includes one of a plastic pocket or a mesh expandable pocket.

4. The portable expandable and collapsible container of claim 3, wherein one or more of the lower fixed chamber, the movable chamber, and the upper fixed chamber are insulated from environmental conditions and from adjacent chambers.

5. The portable expandable and collapsible container of claim 4, wherein one or more of the lower fixed chamber, the movable chamber, and the upper fixed chamber are configured to disassemble from adjacent chambers.

6. The portable expandable and collapsible container of claim 5, further comprising:
one or more heating elements located within one or more of the lower fixed chamber, the movable chamber, and the upper fixed chamber.

7. The portable expandable and collapsible container of claim 5, further comprising:
circuitry configured with a programmable reminder for timed consumption of contents of the expandable and collapsible container.

8. The portable expandable and collapsible container of claim 7, wherein the circuitry is further configured to provide a timed notification for the timed consumption of contents.

9. The portable expandable and collapsible container of claim 8, wherein the upper fixed chamber includes one or more interior chambers configured to contain medicines.

10. The portable expandable and collapsible container of claim 5, further comprising:
a recording medium configured with circuitry to record and provide one or more messages to a user of the expandable and collapsible container.

11. The portable expandable and collapsible container of claim 5, further comprising:
a recording medium configured with circuitry to record and provide one or more instructions to a custodian of the expandable and collapsible container.

12. A portable expandable and collapsible container, comprising:
a lower fixed chamber;
a movable chamber configured to rotate outward away from a central body of the container in an expansible position and to rotate inward in a collapsible position;
an upper fixed chamber;
a first lid configured to cover the lower fixed chamber and rotate outward away from the central body of the container in an expansible position and to rotate inward in a collapsible position;
a second lid configured to cover the movable chamber and to rotate outward away from the central body of the container in an expansible position and to rotate inward in a collapsible position;
a third lid configured to cover the upper fixed chamber and to rotate outward away from the central body of the container in an expansible position and to rotate inward in a collapsible position;
one or more stability structures on a lower portion of the portable expandable and collapsible container; and
openings within the first lid, the second lid, the third lid, and the movable chamber, the openings configured to receive a straw for drinking liquid contents from the lower fixed chamber.

13. The portable expandable and collapsible container of claim 12, wherein the one or more stability structures include at least one of a lower stability chamber or plate, one or more anchor posts, or a plurality of stability arms.

14. The portable expandable and collapsible container of claim 12, wherein one or more of the lower fixed chamber, the movable chamber, and the upper fixed chamber are configured to disassemble from adjacent chambers.

15. The portable expandable and collapsible container of claim 12, further comprising:
one or more of an attached handle or one or more wheels configured to assist with moving the portable expandable and collapsible container.

* * * * *